Figure 1:
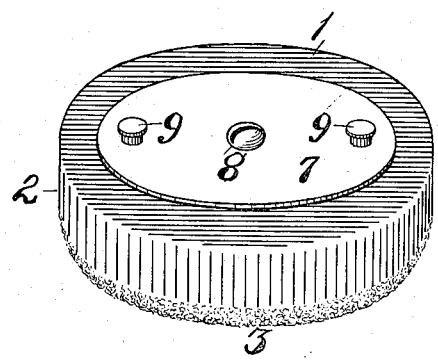

No. 881,218. PATENTED MAR. 10, 1908.
E. R. BATHRICK.
TRUSS PAD.
APPLICATION FILED FEB. 5, 1907.

Witnesses:
Edna Bortz
Glenara Fox

INVENTOR —
Ellsworth R. Bathrick
BY C. E. Humphrey.
ATTORNEY.

UNITED STATES PATENT OFFICE.

ELLSWORTH R. BATHRICK, OF AKRON, OHIO.

TRUSS-PAD.

No. 881,218.     Specification of Letters Patent.     Patented March 10, 1908.

Application filed February 5, 1907. Serial No. 355,930.

*To all whom it may concern:*

Be it known that I, ELLSWORTH R. BATHRICK, a citizen of the United States, residing at Akron, in the county of Summit and State of Ohio, have invented new and useful Improvements in Truss-Pads, of which the following is a specification.

This invention relates to truss-pads for the treatment and temporary reduction of hernia.

The objects of this invention are to produce a pad having a body portion of soft elastic sponge rubber provided with novel means for fixedly securing the entire device to a supporting medium.

The invention also contemplates that the means employed for securing the pad to a supporting medium will also serve to stiffen the general structure of the pad, without in any manner decreasing its softness and elasticity; but on the contrary, give to it such a firmness as is required for the purposes for which these pads are used.

The invention further contemplates the forming of the body portion thereof in a variety of shapes and sizes in order that it may conform and adapt itself to the requirements of the peculiar case to which it is to be applied.

A practical embodiment of this invention is illustrated in the accompanying drawings, in which similar reference numerals indicate like parts in the different figures.

Figure 2:
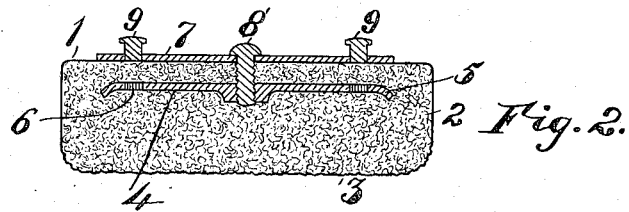

In the drawings, Figure 1 represents a perspective view of my improved pad; and, Fig. 2 a longitudinal, vertical, central section of the same showing the interior thereof.

In the drawings, 1 designates a pad of soft elastic sponge rubber in approximately the form of an ellipse with straight sides 2 with the cellular rubber exposed on the under face thereof. The peculiar shape, thickness and general outline of this pad is subject to change to meet the various requirements of each particular case, and I therefore do not confine myself to the peculiar shape illustrated here.

Embedded within the body of sponge rubber is a plate 4 preferably having downturned edges 5 and one or more perforations 6. On the rear or smooth face of the pad is a plate or backing 7, preferably conforming in general outline to the shape of the pad and considerably less in size so as to permit the body of rubber to project outwardly therefrom. The backing 7 is secured to the embedded plate 4 by means of a screw 8, although other means for compressing a portion of the rubber between these two plates and secure them both against unintentional removal may be utilized.

On the plate 7 are a pair of studs 9 used to attach the plate to a supporting medium such as a belt. The manner of embedding the plate 4 in the body of sponge rubber is immaterial to this invention and a variety of ways may be employed to accomplish this result. In order to secure the backing 7 firmly in position with respect to the pad, the screw 8 is screwed down sufficiently to compress the rubber existing between the two plates 4 and 7 to prevent the screw becoming accidentally loosened.

It will be seen from the foregoing that the backing 7 stiffens the general structure, especially the rear portion of the pad, and the embedded plate 4 subserves the same purpose with respect to the main central portion thereof, at the same time affording an unusually convenient means for mounting the backing in place.

Having thus described my invention, what I claim and desire to secure by Letters Patent, is:—

A truss pad comprising a body portion formed of an integral body of cellular sponge rubber and having embedded therein at a point between its center and its inner face a longitudinally disposed stiffening plate provided with an enlarged central portion and a series of openings, one of which has its wall threaded and arranged in the enlarged central portion of the plate, said stiffening plate having an inclined marginal portion, the inclination of said marginal portion being towards the front face of said body portion, a back plate mounted directly against the inner face of the body portion and provided with a centrally disposed opening and further having a pair of studs projecting rearwardly whereby said pad can be connected to a suspension element, said studs being arranged in longitudinal alinement with respect to the opening in the back plate, and a screw-threaded headed pin extending through the central opening in the back plate and engaging in the central opening of the stiffening plate for adjustably connecting the stiffening plate to the back plate, that portion of the rear face of the stiffening plate other than the bent marginal portion extending in the same plane throughout.

In testimony whereof I have hereunto set my hand in presence of two subscribing witnesses.

ELLSWORTH R. BATHRICK.

Witnesses:
C. E. HUMPHREY,
GLENARA FOX.